United States Patent [19]

Popp

[11] Patent Number: 4,659,282
[45] Date of Patent: * Apr. 21, 1987

[54] APPARATUS FOR PREVENTING THE SPREADING OF TITANIUM FIRES IN GAS TURBINE ENGINES

[75] Inventor: Joachim Popp, Dachau, Fed. Rep. of Germany

[73] Assignee: MTU Motoren- und Turbinen-Union Muenchen GmbH, Munich, Fed. Rep. of Germany

[*] Notice: The portion of the term of this patent subsequent to Feb. 10, 2004 has been disclaimed.

[21] Appl. No.: 704,525

[22] Filed: Feb. 22, 1985

[30] Foreign Application Priority Data

Mar. 3, 1984 [DE] Fed. Rep. of Germany ....... 3407946

[51] Int. Cl.[4] ............................................... F01D 5/08
[52] U.S. Cl. .................................... 415/177; 415/178; 415/200; 415/212 A; 165/47; 165/133; 29/156.8 R; 29/527.1
[58] Field of Search ............... 415/177, 178, 219 R, 415/174, 200, 108, 168, 212 A, 199.5, 9, 196; 29/156.8 R, 157 R, DIG. 25, 527.1, 458; 165/47, 49, 133

[56] References Cited

U.S. PATENT DOCUMENTS

| | | | |
|---|---|---|---|
| 2,710,523 | 6/1955 | Purvis ................................ | 415/214 |
| 2,922,721 | 6/1960 | Tarkan et al. ..................... | 415/214 |
| 3,097,824 | 7/1963 | Bunger et al. ..................... | 415/9 |
| 3,221,500 | 12/1965 | Hill ................................... | 415/214 |
| 3,425,665 | 2/1969 | Lingwood ......................... | 415/174 |
| 3,800,864 | 4/1974 | Hauser et al. ..................... | 165/47 |
| 3,813,185 | 5/1974 | Bouiller et al. ................... | 415/199.5 |
| 4,122,673 | 10/1978 | Leins ................................. | 415/200 |
| 4,155,680 | 5/1979 | Linko, III et al. ................. | 415/144 |
| 4,199,300 | 4/1980 | Tubbs ................................ | 415/174 |
| 4,212,348 | 7/1980 | Kobayashi ........................ | 165/49 |
| 4,273,824 | 6/1981 | McComas et al. ................ | 415/200 |
| 4,432,413 | 2/1984 | Brass et al. ....................... | 165/133 |

FOREIGN PATENT DOCUMENTS 580334  11/1977  U.S.S.R. ........................ 415/177

Primary Examiner—Robert E. Garrett
Assistant Examiner—John Kwon
Attorney, Agent, or Firm—W. G. Fasse; D. H. Kane, Jr.

[57] ABSTRACT

The spreading of a so-called titanium fire is prevented in a turbine engine in which at least one turbocomponent, e.g. the compressor, including its stator inner and outer housing sections and the rotor are made substantially or completely of titanium or of a titanium alloy, by a heat-dissipating layer on an outer housing section surrounding an inner housing section directly facing the rotor. A radial spacing is provided between the inner and outer stator housing sections. The heat-dissipating layer of a highly heat-conducting material covers the inner surface of the outer stator section and permits the concentrated thermal energy of, e.g., a glowing titanium particle, after is has burned through the stationary inner stator section or wall, to be dissipated fast enough to prevent an ignition of the outer stator section to thereby restrict the damage to the inner stator section.

15 Claims, 1 Drawing Figure

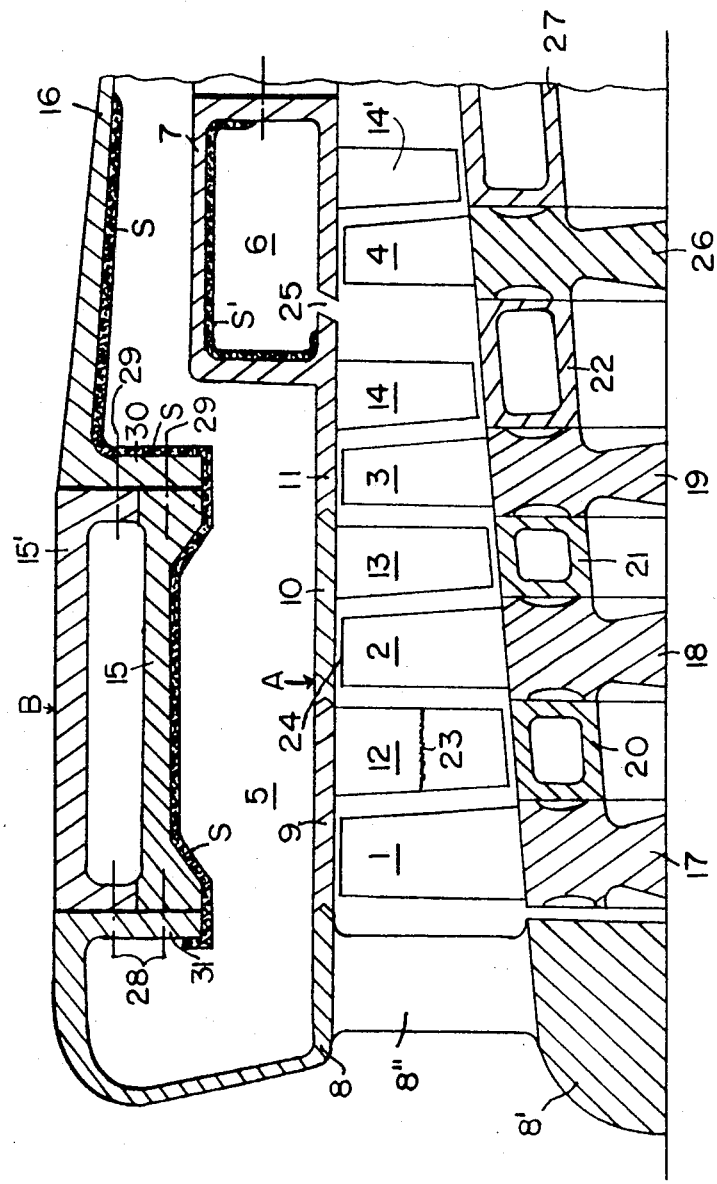

APPARATUS FOR PREVENTING THE SPREADING OF TITANIUM FIRES IN GAS TURBINE ENGINES

FIELD OF THE INVENTION

This invention relates to an apparatus for preventing the spreading of titanium fires in turbomachines, especially gas turbine or turbojet engines, where at least one turbocomponent, e.g. the compressor, including stationary inner and outer component structures and the rotor, are essentially or entirely made of titanium or a titanium alloy, except the stator blades.

DESCRIPTION OF THE PRIOR ART

In gas turbine engines, especially gas turbine engines for aircraft, use is made, among others, of titanium alloys for casings, rotors and blades. In the event of engine damage, a foreign object or a fragment of an engine component may be jammed between the titanium rotor blade and the titanium casing and be carried along circumferentially by the rotor blades causing friction resulting in overheating of the blades and casing. The same may happen when, for example, titanium rotor blades or other rotating titanium components contact the stationary titanium parts when the axial or radial clearance no longer exists. In such a situation the ambient conditions may be such that the titanium may start burning in an explosive manner at the point of friction. Cases have been known where flying and burning titanium particles have pierced several walls, even of steel, until the so-called titanium fire died of its own once said ambient conditions ceased to prevail. It is clear that so far it has been due only to favorable circumstances that catastrophies due to titanium fires have not occurred in aviation.

In order to utilize the advantages afforded by titanium, which come as a result of its low specific weight at excellent strength at temperatures up to 450° C., the following measures have been proposed heretofore.

Rotor and stator blades have been dimensioned for better strength to prevent fracture in the event of an impact of a foreign object. However, this approach has resulted in aerodynamically inferior blade profiles of heavier weight.

Larger axial or radial spacings or gaps between rotating and stationary titanium components have been used to prevent rubbing in service. However, such larger gaps cause corresponding leak air losses.

Coating the stationary components has been suggested for protecting them in the event of incidental rubbing. However, aerodynamic considerations permit partial coating only.

The stationary components have been made of steel. However, an unproportionally large weight is the penalty.

Protective liners of carbon/polyimide resin have been used on components jeopardized by flying and burning titanium particles in case of a titanium fire. However, such liners can be used only at service temperatures not exceeding 260° C., which prevents their application, e.g., directly at the source of ignition in a high-pressure compressor.

OBJECTS OF THE INVENTION

In view of the foregoing it is the aim of the invention to achieve the following objects singly or in combination:

to avoid the mentioned disadvantages of the prior art;
to prevent the spreading of a titanium fire, once such a fire has started in one section of an apparatus, into other sections of the apparatus, and
to construct a gas turbine housing in such a way that the housing components may be easily provided with features which prevent the spreading of a titanium fire.

SUMMARY OF THE INVENTION

According to the invention there is provided an apparatus for preventing the spreading of titanium fires in gas turbine engines having a rotational axis, comprising stator means and rotor means operatively supported in said rotor means, said stator means and said rotor means being made, at least partially, of titanium or of a titanium alloy, wherein said stator means comprise a first inner stator section located radially adjacent to and around said rotor means for forming a gap between said rotor means and said first inner stator section, and a second outer stator section operatively surrounding said first inner stator section with a radial spacing between said first and second stator sections, said second outer stator section comprising a radially inwardly facing surface and a layer of highly heat-conducting material intimately bonded to said inwardly facing surface, said heat-conducting layer preventing said spreading of titanium fires.

In the arrangement of the present invention, burns through the stationary inner component structure or casing wall of the stator immediately facing the rotor or the rotor blades are accepted by making certain that a glowing flying titanium fragment impinges on the highly heat-conducting layer on the outer component structure or outer casing wall next in the path of the flying fragment. The highly heat-conducting layer permits the localized thermal energy of the glowing titanium fragment to be rapidly distributed. Such heat distribution prevents reaching the ignition temperature of the otherwise severely endangered casing component structure or of the outer casing wall. Thus, without risking the spreading of a titanium fire, this type of damage can be limited to the inner stationary casing structure, and the risk of burns through other structural casing components, including the airframe, is safely prevented. This feature has an important advantage, among others, in that the inner stationary component structure or casing wall directly facing the rotor or the rotor blade tips can have an aerodynamically ideal configuration, excepting perhaps the usual abradable coatings, if used. For the rotor also, maximum use can be made of titanium as a component material without aerodynamic or weight penalties. In other words, the turbocomponent according to the invention, e.g. the compressor, can be optimally adapted to the aerothermodynamic cycle without any restrictions imposed heretofore by the risk of a spreading titanium fire.

By providing the ring space of the present invention between the inner and outer stator casing sections, burning and flying titanium component fragments are positively entrapped in the ring space and a fire cannot spread due to the heat dissipation by said layer of highly heat-conducting material.

A further, alternative safety feature is provided by two ring chambers, which have the advantage, especially for casing concepts in which a strength compromise must be made for the inner stationary component structure or for the inner casing due to required inner casing configurations, that any flying and burning fragment is easily entrapped. Such required inner casing configurations may call for the presence of bleed-air slots or ports on engine compressors, for example. In such a structure a flying titanium particle can easily pierce the stationary inner casing section of the stator with little trouble thereby retaining a relatively high momentum sufficient for piercing the first outer component structure or casing wall plus the associated, highly heat-conducting layer. Due to the additional outer component structure or casing wall with its highly heat-conducting layer the temperature will safely be lowered sufficiently to prevent the spreading of a titanium fire.

The highly heat-conducting layer or layers are preferably made of an aluminum alloy or a copper alloy as will be described in more detail below.

BRIEF DESCRIPTION OF THE DRAWING

In order that the invention may be clearly understood, it will now be described with reference to the single FIGURE of the accompanying drawing which is a sectional view through a portion of a turbojet engine.

DETAILED DESCRIPTION OF A PREFERRED EXAMPLE EMBODIMENT AND OF THE BEST MODE OF THE INVENTION

The single FIGURE shows part of an axial-flow compressor of a turbojet engine, wherein the stationary inner and outer component structures and the rotor are made essentially of titanium or of a titanium alloy. In accordance with the basic concept of the present invention a first, inner stator section A directly facing the rotor or the rotor blades 1, 2, 3, 4 of the various compressor stages, is surrounded at a radial distance, by a second outer stator section B provided on its inner surface with a highly heat-conducting layer S.

As shown in the drawing the inner stator section A encloses together with the outer stator section B at least one continuous annulus or ring space 5.

In another embodiment of the present invention the accompanying drawing shows an additional ring space or further annulus 6 located within the first ring space 5. A portion of the highly heat-conducting layer S of the ring space 5 extends substantially in parallel to the outer wall structure 7 of the further annulus or ring space 6, which on its radially inwardly facing side indirectly facing the rotor section is provided with a further highly heat-conducting layer S'. Thus, any burning fragments entering the ring chamber 6 through the slots 25 are facing two heat-conducting layers S, S' if they should penetrate through the wall 7.

In the present embodiment the inner rotor section A and the outer rotor section B each comprise individual inner and outer casing components. The inner section A comprises a housing ring 8 supported on a central hub 8' by spokes 8". Inner housing members 9, 10 and 11 are operatively interconnected, for example, by a tongue and groove structure, as shown. The ring 8 and members 9, 10, 11 form the outer flow duct wall and carry the stator guide blades or vanes 12, 13, 14, 14'. The outer stator section B comprises housing members 15, 15' and 16 in the form of ring members which prior to their assembly are provided with the heat-dissipating layer S. Bolts 28 connect the ring members 15, 15' with a flange 31 of the ring 8. Bolts 29 connect the ring members 15, 15' with a flange 30 of the ring member 16. These ring members 15, 15', 16 are essential to the present invention because they permit the formation of the heat-conducting layer S and take the form of supporting rings which are connected to an engine casing component. The protective, highly heat-conducting layer, e.g. S, can be deposited on the stationary outer component structure B or on the outer components, e.g. 15, 16 in axial and radial directions. In other words, the flanges, for example 30, are also coated with the protective layer S on a surface extending radially but facing axially.

The highly heat-conducting layer S can also be deposited in the form of a brushed-on or sprayed-on paint-like liquid or as a pasty compound by a spackling type of application. When dry, the layer provides the required high heat-conductivity.

The material of the layer may preferably be an aluminum alloy, comprising 94% of aluminum and 6% of silver by weight of the alloy.

The material of the layer may also be a copper alloy or a copper, zink, silver alloy with 38% of copper, 32% of zink and 30% of silver by weight of the alloy.

In the illustrated embodiment all members of the inner stator housing section A and of the outer stator housing section B such as the inner ring members 8, 9, 10, 11 or the outer ring members 15, 15', 16, the rotor blades 1, 2, 3, 4 and the rotor disks 17, 18, 19 and 26, and the respective intermediate rings 20, 21, 22, 27 of the rotor are made of titanium or of a titanium alloy, whereas the guide or stator vanes 12, 13, 14 and 14' are made of another metallic material, for example a nickel alloy.

The invention shown in the accompanying drawing operates as follows. In the event of a fracture of, e.g., the guide vane 12 at point 23, the fragment may conceivably get stuck above one of the rotor blades 2 at point 24 and be taken along circumferentially by the rotor blade 2, causing a titanium fire as a result of the frictional heat. When the glowing titanium particles burn through the inner housing ring member 10 and fly radially outwardly, they impinge on the layer S of a highly heat-conducting material deposited on the radially inner side of the outer housing ring 15, which here takes the form of a supporting ring.

This layer S permits the concentrated thermal energy of the glowing titanium particles to be rapidly dissipated such that their high temperature level is rapidly reduced, which prevents reaching the ignition temperature of the titanium of which the ring member 15 is made. The damage therefore, is limited to the inner casing, and further through burns, which otherwise might ultimately reach the air frame through the housing members, are prevented.

The above operating mode as just described takes place analogously when the compressor sucks in some other, perhaps foreign body or a rotor fragment, especially if made of titanium or of a titanium alloy.

The accompanying drawing further illustrates the bleed-air slot 25 arranged between two compressor stages. The slot 25 is an interruption in the wall of the inner housing member 11 which weakens the inner stator section A. However, the second ring chamber 6 with its protective, heat-dissipating layer S' of the same highly heat-conducting material as the layer S provides the desired protection against any titanium fires that could be caused by a burning fragment passing through the slot 25.

Although the invention has been described with reference to specific example embodiments, it will be appreciated, that it is intended to cover all modifications and equivalents within the scope of the appended claims.

What I claim is:

1. An apparatus for preventing the spreading of titanium fires in gas turbine engines having a rotational axis, comprising stator means (7, 8, 9, 10, 11) and rotor means (17, 18, 19, 20, 21, 22) operatively supported in said stator means, said stator means and said rotor means being made, at least partially, of titanium or of a titanium alloy, wherein said stator means comprise a first inner stator section (A) located radially adjacent to and around said rotor means for forming a gap between said rotor means and said first inner stator section (A), and a second outer stator section (B) operatively surrounding said first inner stator section (A) with a radial spacing (5) between said first (A) and second (B) stator sections, said second outer stator section (B) comprising a radiallly inwardly facing surface and a layer (S) of highly heat-conducting material intimately bonded directly to said inwardly facing surface, said heat-conducting layer preventing said spreading of titanium fires.

2. The apparatus of claim 1, wherein said inner stator section and said outer stator section enclose a ring space which is closed when said sections are assembled to form said stator means.

3. The apparatus of claim 2, wherein said inner stator section comprises wall members forming a further ring space inside said first mentioned ring space, said further ring space having a radially inwardly facing surface and a radially outwardly facing surface, said first mentioned layer of highly heat-conducting material extending substantially in parallel to said radially outwardly facing surface of said second ring space across said first mentioned ring space, said apparatus comprising a further layer of highly heat-conducting material intimately bonded to said radially inwardly facing surface of said further ring space.

4. The apparatus of claim 1, wherein said inner stator section comprises a plurality of stator members surrounding with their radially inwardly facing surface said gap, said outer stator section comprising at least one support ring and at least one outer housing member, and means for operatively interconnecting said support ring and said outer housing member.

5. The apparatus of claim 1, wherein said second outer stator section comprises radially inwardly reaching flange means having axially facing surface positions, said layer of highly heat-conducting material being intimately bonded to said radially inwardly facing surface of said outer stator section in radial and axial directions so that at least part of said axially facing surface portions is also covered by said layer of highly heat-conducting material.

6. The apparatus of claim 1, wherein said layer of highly heat-conducting material is a sprayed-on metal layer.

7. The apparatus of claim 1, wherein said layer of highly heat-conducting material is a liquid applied by painting or spraying which forms said layer when dry.

8. The apparatus of claim 1, wherein said layer of highly heat-conducting material is a paste-type material which forms said layer when dry.

9. The apparatus of claim 1, wherein said layer of highly heat-conducting material is an aluminum alloy.

10. The apparatus of claim 9, wherein said aluminum alloy comprises 94 percent of aluminum and 6 percent of silver, both by weight of the alloy.

11. The apparatus of claim 1, wherein said layer of highly heat-conducting material is a copper alloy.

12. The apparatus of claim 11, wherein said copper alloy is a copper-zinc-silver alloy.

13. The apparatus of claim 12, wherein said copper-zinc-silver alloy comprises 38 percent of copper, 32 percent of zinc, and 30 percent of silver, all in percent by weight of the alloy.

14. The apparatus of claim 1, wherein said rotor means are made entirely of titanium or of titanium alloy, and wherein said stator means comprise guide vanes made of a metallic material other than titanium or titanium alloy, while all other parts of said stator means are made of titanium or of titanium alloy.

15. The apparatus of claim 14, wherein said stator guide vanes are made of a nickel alloy.

* * * * *